US009413152B2

(12) United States Patent  
Fritz et al.

(10) Patent No.: US 9,413,152 B2  
(45) Date of Patent: Aug. 9, 2016

(54) FAULT-PROOF FEED-THROUGH DEVICE

(71) Applicant: Schott AG, Mainz (DE)

(72) Inventors: Oliver Wolfgang Fritz, Obersuessbach (DE); Josef Nisslbeck, Bruckberg (DE); Juergen Suttner, Marklkofen (DE); Thomas Fink, Landshut (DE)

(73) Assignee: SCHOTT AG, Mainz (DE)

( * ) Notice: Subject to any disclaimer, the term of this patent is extended or adjusted under 35 U.S.C. 154(b) by 206 days.

(21) Appl. No.: 14/178,891

(22) Filed: Feb. 12, 2014

(65) Prior Publication Data

US 2014/0231133 A1    Aug. 21, 2014

(30) Foreign Application Priority Data

Feb. 19, 2013    (DE) .......................... 10 2013 202 614

(51) Int. Cl.
| | |
|---|---|
| *H02G 3/22* | (2006.01) |
| *G21C 13/06* | (2006.01) |
| *G21C 17/116* | (2006.01) |
| *G02B 6/42* | (2006.01) |
| *G21C 13/036* | (2006.01) |
| *F16L 5/02* | (2006.01) |

(52) U.S. Cl.
CPC .. *H02G 3/22* (2013.01); *F16L 5/02* (2013.01); *G02B 6/4248* (2013.01); *G21C 13/036* (2013.01); *G21C 13/06* (2013.01); *G21C 17/116* (2013.01); *Y02E 30/40* (2013.01)

(58) Field of Classification Search
CPC ............... H02G 3/22; F16L 5/00; F16L 5/10; G02B 6/4828; H01B 17/26; H01B 17/265; H01B 17/30; H01B 17/301; H01B 17/303; H01B 17/305; H01B 17/306; H01B 17/308; H01B 17/583; H01B 17/62
USPC .................................................. 174/650, 659
See application file for complete search history.

(56) References Cited

U.S. PATENT DOCUMENTS

| | | | | |
|---|---|---|---|---|
| 2003/0234115 A1* | 12/2003 | Deng | ..................... | H01B 17/30 |
| | | | | 174/564 |
| 2008/0017415 A1* | 1/2008 | Suter | .................... | G02B 6/4428 |
| | | | | 174/650 |

(Continued)

FOREIGN PATENT DOCUMENTS

| | | |
|---|---|---|
| EP | 2031288 A1 | 3/2009 |
| JP | S6317712 A | 1/1988 |

(Continued)

OTHER PUBLICATIONS

English translation of German Office Action dated Jan. 23, 2014 corresponding to German Patent App. No. 10 2013 202 614.5, 8 pp.

*Primary Examiner* — Hoa C Nguyen  
*Assistant Examiner* — Amol Patel  
(74) *Attorney, Agent, or Firm* — Ohlandt, Greeley, Ruggiero & Perle, LLP

(57) ABSTRACT

A feed-through is provided that includes a flange and a first functional component. The flange has a through-opening in which the first functional component is arranged and is connected to the flange such that the through-opening is sealed. The first functional component has at least one deformation region, in which a recess is provided such that the mechanical stability of the first functional component is reduced in the deformation region. In this manner, the first functional element can be deformed in the deformation area when mechanical load is applied.

24 Claims, 10 Drawing Sheets

(56) References Cited

U.S. PATENT DOCUMENTS

| | | | | |
|---|---|---|---|---|
| 2009/0032283 A1* | 2/2009 | Sjoberg | ................ | H01B 17/308 174/152 R |
| 2010/0038131 A1* | 2/2010 | Belton | ................ | H01B 17/306 174/650 |
| 2011/0018206 A1* | 1/2011 | Beele | ........................ | F16L 5/04 277/316 |
| 2011/0061896 A1 | 3/2011 | Bernauer et al. | | |
| 2013/0213546 A1* | 8/2013 | Cichon, Jr. | ................ | F16L 5/00 156/60 |

FOREIGN PATENT DOCUMENTS

| | | | | |
|---|---|---|---|---|
| JP | EP 2031288 A1 * | 3/2009 | ................ | F16L 5/10 |
| JP | 2010220463 A | 9/2010 | | |

\* cited by examiner

FAULT-PROOF FEED-THROUGH DEVICE

CROSS REFERENCE TO RELATED APPLICATIONS

This application claims benefit under 35 U.S.C. §119(a) of German Patent Application No. 10 2013 202 614.5, filed Feb. 19, 2013, the entire contents of which are incorporated herein by reference.

BACKGROUND OF THE INVENTION

1. Field of the Invention

The invention relates to feed-through devices or shortly named 'feed-throughs' that are capable of bearing a mechanical load and are therefore fault-proof, and also to the use thereof. In particular, the invention relates to electrical and/or optical feed-throughs, by means of which signals and/or electrical currents can be guided from or into security-relevant containers. In particular, this also includes feed-throughs in the low-voltage and medium-high voltage range. Reference is made generically here to large-scale feed-throughs, since their components may have diameters from a few centimeters to many centimeters and the overall weight may be several kilograms.

2. Description of Related Art

In the case of containers for storing or conveying flammable hazardous material, containers of energy production devices or storage devices, or in the case of containers in which hazardous materials are produced and/or stored, referred to collectively as containment structures, it is often necessary to introduce and/or remove electrical currents and/or signals of measurement devices, sensors and/or actuators into/from the container. For example, in facilities for conducting and/or conveying liquefied natural gas, submersible pumps arranged in the container interior are used. In order to introduce the power necessary for the pumps into the container interior, connection devices comprising sealing electrical feed-throughs are used. In the case of energy production units, for example steam generators of power plants, the energy produced has to be removed safely and/or apparatuses in these energy production units have to be supplied with power. To this end, a feed-through is typically flange-mounted to a flange of the containment structure, for example a pressure vessel.

In particular in the case of pressure vessels containing flammable gases and/or liquids, it is important here that the feed-through remains tight over a long period of time. Particularly when storing flammable substances, which may form explosive gas mixtures, there is still the risk that, even with the smallest of leaks which are not critical per se, gas mixtures can be formed in sealed regions of the feed-through. For example, such regions can be formed in fitted protective housings. Should this then lead to an explosion, the feed-through may be damaged in such a way that the hazardous material then exits quickly from the container that is to be closed. This is also relevant in particular in facilities for producing nuclear power, in particular in order to ensure safe containment of the reactor housing, even in the event of a fault.

EP 2 031 288 B1 describes an electrical feed-through for liquid containers, in which an electrical conductor is soldered in a flange by means of an insulating feed-through sleeve. The flange has a feed-through opening, in which the electrically insulating feed-through sleeve is soldered directly. The insulating feed-through sleeve is tubular and in its interior has an electrical conductor which has a diameter smaller than the inner diameter of the feed-through sleeve. At its ends, the gap between the feed-through sleeve and conductor is hermetically closed, such that a relatively large hollow space is located between the feed-through sleeve and the conductor. A bore is located in the feed-through sleeve. The flange is formed in two parts, such that a hollow space is located between the flanges and, through the bore in the feed-through sleeve, connects the hollow space in the feed-through sleeve to the hollow space between the flanges, or a one-part flange is provided with a bore that corresponds to the bore in the feed-through sleeve. By monitoring the pressure in the hollow space of the feed-through sleeve, gas penetrating into the feed-through sleeve can be detected and damage to the feed-through can thus be monitored.

This feed-through is afflicted by the problem that the electrically insulating feed-through sleeve has a specific length. It is tubular and has a hollow space which extends around the inner conductor. The material of the feed-through sleeve is a ceramic, which is known to be a brittle material. In the case of such a feed-through unit, the feed-through sleeve specifically may break under mechanical load. The barrier between the containment structure and the surrounding environment would then be broken. Therefore the feed-through shown in this reference cannot be considered to be fault-proof. Aside from this, the production of such a feed-through sleeve is associated with a high manufacturing outlay.

SUMMARY

On this basis, the object of the invention is to provide an electrical feed-through which makes it possible to withstand higher mechanical loads compared with the above-mentioned feed-throughs, which still reliably closes the containment structure should a barrier be broken, and which can be produced efficiently.

The feed-through according to the invention comprises a flange, which has a through-opening having an inner wall, and a first functional component, which is arranged within the through-opening and is connected to the flange such that the through-opening is sealed, wherein the first functional component is formed substantially from at least one metal and has at least one deformation region, which is formed by at least one recess in the functional component, said recess penetrating through the functional component or reducing the material thickness thereof, such that the mechanical stability of the first functional component is reduced in the deformation region. By this measures the feed-through according to the invention can, virtually speaking, flex under mechanical load. Thereby the deformation region can be deformed and can, within reversibly return into its initial state although the sealing material within one side of the flange might be destroyed.

The concept according to the invention foresees a feed-through in which the deformation area of the first functional component is the described recess within the first functional component. Therefore the first functional component can be considered as one piece. In an alternative embodiment of the inventive concept, the functional component can be divided into separate pieces, which only have a physical connection via another functional component. The deformation area according to this alternative embodiment is so to say the interrupted area between the separated first functional devices. Under mechanical load, the separated first functional elements can perform a reversible relative movement to each other.

The flange may usually be a metal component, for example a plate made of steel in particular. The through-opening can be produced by drilling, but also by milling, turning, forming and all further suitable methods. The through-opening may run mostly perpendicularly through the main surface of the flange, such that the height of its wall surface corresponds substantially to the height of the flange. The flange itself is in turn to be fastened to other components, for example to containment structures. If the flange consists of a metal, the generic feed-through is also referred to as a metal-fixing-material feed-through.

The first functional component is arranged within the through-opening, such that, by fitting the first functional component in the through-opening, the through-opening is sealed. This can be achieved by suitable measures, for example by soldering, hard-soldering, welding, screwing, etc. The first functional component is thus connected to the flange, in particular to the inner wall of the through-opening located in the flange. The through-opening is preferably hermetically closed as a result of this, and where applicable also by further measures on the first functional component. In particular, an electrically conductive connection may be produced here between the flange and first functional component, but also an electrically insulating connection with the use of plastics.

The purpose of the first functional component is to make it possible in the operating state to transmit electrical current and/or electrical signals and/or optical information and/or microwaves through the through-opening and/or also to hold further functional components however. The invention therefore comprises embodiments in which only one functional component is located in the through-opening, that is to say the first functional component, but also embodiments in which further functional components are provided.

In order to improve the mechanical load-bearing capability of the feed-through, an essential feature of the invention is that the first functional component has at least one deformation region, which is formed by a recess in the first functional component, such that the mechanical stability of the first functional component is reduced in the deformation region. The term "recess" is understood to mean a structure penetrating through the first functional component, for example a hole, a slot, etc., but also a local reduction of the material thickness of the first functional component, for example a notch, a groove, a blind bore, etc. The deformation region within the meaning of the invention is a region in which the first functional component can deform under mechanical load, in particular in the operating state and/or in the event of a fault.

The flange and the first functional component connected thereto form a structural unit in the form of a feed-through. The flange itself may be fastened to other components, for example containment structures, using conventional means, preferably reversibly, for example by means of screwing. When installing and/or exchanging the feed-through according to the invention, the entire flange is usually assembled and/or disassembled with the components located therein.

Due to the deformation region, it is possible for torques, pressure, tension, bending moments and/or vibrations to be applied to the first functional component and/or the system formed from first and further functional components (see below). The material of the first functional component advantageously consists here of a material that is flexible and/or deformable to such an extent that it meets the mechanical requirements. Due to the deformation directed into the deformation region, an overload of the feed-through is prevented in the corresponding operating states, in particular a dynamic overload under effective peak loads, and the mechanical load-bearing capacity of the feed-through is thus increased. The deformation region cushions an effective mechanical peak load so to speak, such that it is possible to largely prevent the first functional component from being torn out from the flange and/or to prevent the material of the flange from being torn. The deformation region also serves as a predetermined breaking point, such that, if damage is caused to the first functional component, the damaged spot occurs primarily in the deformation region without breaking the barrier of the feed-through as a whole. This makes the feed-through according to the invention fault-proof in particular.

In accordance with the invention, the first functional component is formed substantially from at least one metal. This means that it consists substantially of one or more metals, including alloys. It is also possible and provided in accordance with the invention for the first functional component to consist in portions of various metal materials. FeNi alloys, such as Co alloys and/or Inconel, copper and/or Cu alloys, such as BeCu alloys, and/or aluminium and/or Al alloys and/or alloys for thermocouples, such as NiCu, NiCr or PtRh, are particularly suitable. NiFe alloys have advantages in terms of their adaptation in respect of thermal dilation, whereas Cu, Cu alloys, Al and Al alloys have advantages in terms of their high conductivity. The selected metals are particularly advantageously resilient at least in the deformation region, such that they can be deformed reversibly. As a result, it is possible for the first functional component to remain intact when loaded by the prevailing force effects.

As described, the flange likewise normally consists of metal. Mild steel with galvanic coating, for example Cu, Ni and/or a combination of both and also Ni alloys, and/or Cr steels, is/are preferred. High-grade steels are also preferred, in particular austenitic high-grade steels, such as AISI 304/304L and 316/316L, which are characterized in particular in the case of marine applications in terms of their resistance to salt water. Steels of high thermal strength, such as Invar, Inconel and Monel, are also preferred. Austenitic steels, which are in particular suitable for low-temperature use due to their high notch impact strength at cryogenic temperatures, are also preferred.

This first embodiment, in which the first functional component is connected to the flange in particular directly or by means of a fixing material made of metal in particular, can in particular produce an electrically conductive connection between the flange and the first functional component. The first functional component is then in particular a component that itself does not conduct electrical current. Such components are for example waveguides, for example for transmitting microwaves and/or sound waves.

In an alternative embodiment, at least one second functional component is fitted in the first functional component. For example, this may include signal conductors and/or electric conductors, for example further electrical conductors electrically insulated from the first functional component and/or optical conductors such as optical waveguides. In these cases, the first functional component is tubular in particular, and the second functional component is held in the tube interior. In particular, the second functional component is held by electrically insulating materials sealing the first functional component, for example plastics and/or glass materials and/or glass-ceramic materials. Particularly in the case of glass materials and/or glass-ceramic materials, a hermetic seal of the first functional component and therefore of the feed-through as a whole can be achieved in a lasting manner.

In accordance with a preferred embodiment the feed-through according to the invention is formed such that the first functional component is arranged so that a hollow space is formed between the inner wall of the through-opening and the first functional component in the through-opening and is connected to the flange such that the through-opening is sealed. The hollow space is connectable to a measuring instrument by means of at least one monitoring opening. The monitoring opening runs through one of the electrical insulation components and/or the flange.

The hollow space can be formed by suitable embodiments of the first functional component and/or of the through-opening, in particular of the inner wall of the through-opening. For example, these embodiments may be recesses in the first functional component and/or in the through-opening, particularly if the first functional component is fitted in the through-opening directly, for example by screwing. If a fixing material is used to fit the first functional component in the through-opening, the hollow space may be formed particularly advantageously by fixing material not provided locally. The term "hollow space" in the context of the invention also means that the hollow space is closed, apart from the monitoring opening possibly provided, and that the through-opening is therefore sealed, even with the presence of the hollow space.

In a particularly preferred embodiment, the feed-through comprises at least two insulation components which are separate from one another and in which the first functional component is held in the through-opening in a manner electrically insulated from the flange, wherein the insulation components form a hollow space between themselves and both the inner wall of the through-opening and the first functional component. The monitoring opening in particular opens out into this hollow space.

The longitudinal axis of the first functional component usually extends parallel to the longitudinal axis of the through-opening, and the arrangement of the first functional component in the through-opening is advantageously even coaxial. The at least two electrical insulation components of this embodiment surround the first electrical conductor, in particular in an annular manner, and hold it in the through-opening. The electrical insulation components are advantageously glass components, glass-ceramic components and/or ceramic components. This technology is known to a person skilled in the art of glass-metal feed-throughs. The first functional component is glazed so to speak in the through-opening by means of the insulation components. These materials have the advantage that they have high insulation values and are chemically insensitive to the attack of aggressive substances. They are afflicted however by the disadvantage that they are brittle materials which can be sensitive to mechanical loads. The use of plastics, in particular high-performance plastics, such as PEEK, is also possible however.

If glass, glass-ceramic and/or ceramic components are used as insulation components, the material of the first functional component is advantageously selected such that it has approximately the same coefficients of thermal expansion.

In accordance with the invention, the at least two electrical insulation components separate from one another are introduced into the through-opening in this embodiment such that they form a hollow space between themselves and both the inner wall of the through-opening and the first electrical conductor. In the case of a circular through-opening, the hollow space thus has a form of a ring. All other diameter geometries are of course also possible and included by the invention, as are all resultant geometries of the hollow space.

The first functional component may consist of solid material in this embodiment, for example by being formed in a rod-shaped manner, and/or having a hollow space at least in portions and/or being formed of solid material in portions. If the first functional component is formed as solid material, the deformation region can be formed in particular by notching in the first functional component or by the spacing between the individual portions.

In a preferred embodiment which develops the described feed-through, the first functional component is tubular at least in portions, wherein at least one second functional component is arranged in the tubular portions, and wherein the first functional component and the second functional component are interconnected in a gap-free manner at least in portions.

The second functional component may consist of a different material compared with the first functional component. The first functional component and the second functional component are interconnected in a gap-free manner at least in portions, in particular at least at one end. The end with the gap-free connection is usually the end that is located in the containment structure during operation. The gap-free connection can be produced over the dimensions of the first and second functional component if these are selected such that the contours fit together in a gap-free manner at least in portions, or by filling the gap with filler material. The purpose of the filler material is to close the gap tightly at least in portions. All suitable materials can be used as filler material, but in particular glass solders and/or metal solders, that is to say Cu/Ag alloys and/or a weld seam, if a hermetically tight connection is to be obtained, however plastics may also be used, in particular high-performance plastics, such as PEEK.

The gap-free connection between the first and the second functional component may thus be electrically conductive, but also electrically insulating. The gap-free connection can be produced not only at one end, but at any desired portion of the first and/or second functional component.

The embodiment of the first functional component formed from solid material which is held in an electrically insulated manner in the through-opening is particularly advantageous in applications that allow low currents to flow via the first functional component. For stronger currents, the embodiment in which the second functional component is held by the first functional component and comprises an electrical conductor formed from a more conductive material, in particular copper, is advantageous. The gap-free connection between the first functional component and the second functional component is necessary, since otherwise the medium to be contained in the containment structure could leak through this gap, which is to be avoided at all costs. It is therefore particularly advantageous if the gap is soldered and/or welded. With this embodiment, a reliable electrical connection can thus be produced between the first and second functional component, but a hermetic seal can also be achieved between the first and second conductors. Since the insulation components also enable hermetic glazing in, the feed-through according to the invention can, as a whole, provide a fully hermetic seal.

In a further preferred embodiment of the feed-through according to the invention, the first functional component consists of at least two separate tube portions, which are connected at least in portions to the second functional component, and the deformation region is formed by the distance between the separate tube portions of the first functional component.

As already described, the deformation region is characterized by a recess and/or at least one locally reduced material thickness of the first functional component. A peripheral slot in the first functional component may be considered to be a recess, or else two separate tube portions of the first functional component which can be interconnected mechanically and in particular also electrically by the second functional component. The distance between the tube portions of the first functional component is then the deformation region. The invention includes both solutions.

In a particularly preferred embodiment of the feed-through according to the invention, the second functional component comprises at least two portions which, with extension and/or compression of the deformation region along the longitudinal axis thereof, can be distended and/or compressed with respect to one another and/or can be tilted with respect to one another and/or can be twisted with respect to one another and/or can be subject to a shear stress relative to one another.

Of course, the connection between these portions should be maintained during these deflections and/or displacements of the portions of the second functional component. Due to the mutual displaceability and/or deflectability of the regions of the second functional component, a particularly high level of efficacy of the deformation region is achieved, in particular if the displaceable and/or deflectable region of the second functional component is arranged at the same position along the longitudinal axis as the deformation region of the first functional component.

The at least two portions of the second functional component are particularly preferably connected by a flexible structure or by structures that engage in one another and are interconnected in an extendable and/or retractable manner.

The flexible structure may be a copper strip for example, a corrugated and/or kinked copper sheet, which in particular has the structure of an accordion so to speak, or any further suitable flexible structure. Alternatively or additionally and just as preferably, it is possible for the ends facing one another of the portions of the second functional component to have structures that engage in one another, for example such as a plug and socket.

As described, the second functional component may be an electrical conductor for example for transmitting direct and/or alternating currents, in particular for high amperages. It is also possible for the second functional component to be a thermocouple. Such a component can make use of the Seebeck effect and can make it possible to measure a voltage dependent on the temperature. In this case, the second functional component comprises a thermocouple wire in particular made of NiCr, NiCu or PtRh and also other conventional thermocouple wire alloys.

The deformation region may be provided at any points of the first functional component. For example, it may be provided at a distance from the primary plane of the flange along the longitudinal axis of the first functional component within or outside the containment structure, for example in order to supply electric motors there with electric current. This could in turn exert a torque onto the first functional component and the second functional component mechanically connected thereto where applicable. Due to the deformation region, a twisting and/or a resilient oscillation of the first and/or second functional component about its longitudinal axis is also possible (in other words a torsion), such that the corresponding mechanical moment is kept away from the fastening of the first functional component in the through-opening, in particular the insulation component, or at least is reduced such that it no longer causes damage there. In this exemplary application, this measure prevents the first and/or second functional component from being unscrewed from the fixing material, in particular the insulation component. A resilient bending oscillation of the first and/or second functional component is also possible, wherein the bend is arranged in the deformation region. This also relieves the insulation component in particular and improves the mechanical load-bearing capacity of the feed-through according to the invention.

The deformation region is particularly advantageously provided in the hollow space between at least two separate insulation components. This embodiment has the advantage that the first and/or the second functional component has/have the maximum stability at its/their ends. If the feed-through is exposed however to excessively high mechanical loads, in particular compressive loads, which act perpendicularly on the longitudinal axis of the functional components, this may lead to a breakage of the insulation components. If the deformation region is located however in the hollow space between the insulation components, the mechanical load is at least reduced by the deformation region and breaks only one of the insulation components, generally the one that is closest to the source of the mechanical load. Because the insulation components are separated from one another however, the destruction of an insulation component does not mean the loss of the barrier however. The other undestroyed insulation component then still ensures that the container is reliably closed. In particular, peak pulses of the compressive load can thus be reliably intercepted, which has particular advantages in the case of fault-relevant applications. The breakage of one insulation component can be detected by suitable measures, for example acoustic and/or optical monitoring arrangements, whereupon an exchange of the feed-through can be initiated.

In a particularly preferred embodiment of the feed-through according to the invention, the hollow space can be connected by means of at least one monitoring opening to a measuring instrument, and the monitoring opening runs through one of the electrical insulation components and/or the flange. The deformation region is preferably arranged in the hollow space and the deformation region is preferably at least one recess in the tubular first functional component, said recess connecting the interior of the first tubular functional component and the hollow space.

The monitoring opening advantageously runs through the flange, wherein one end of the monitoring opening is provided in particular in the inner wall of the through-opening in the region of the hollow space, or runs through at least one of the insulation components or through a combination of the two. Here, the deformation region of a tubular first functional component is a recess in particular, which connects the interior of the first functional component to the hollow space. In this context, the recess means an opening, for example a slot, locally penetrating the wall of the first functional component. Particular advantages of this embodiment are that a breakage of an insulation component and/or a failure of the sealing of an insulation component with respect to the flange and/or the first functional component can be determined and/or monitored particularly easy. Since the deformation region penetrates through the first functional component, the gap-free connection between the first and second functional component can also be monitored. Due to the measuring instruments attachable to the monitoring opening, not only can media infiltrating into the hollow space due to failure of the insulation components thus be detected, but also media infiltrating due to failure of the connection between the first and second functional component. This is advantageous in particular since the first and the second functional component normally always have a gap between the outer wall of the functional component and the inner wall of the first functional component, said gap possibly being dependent on the different thermal expansion behaviour of the functional components and also on the operating and/or fault temperatures to which the feed-through is exposed. This embodiment also enables the deformation region to function as a monitoring opening so to speak.

The measuring instrument may be a pressure gauge for example. By means of this, a pressure change in the hollow space can be indicated and may be an indicator for the triggering of an alarm for example. It is also possible to form the measuring instrument as a gas monitor, which detects the infiltration of a different gas into the hollow space. The hollow space itself can be filled with negative pressure, vacuum, any shielding gases, non-conductive fluids, etc. All of these options and the connectability to all possible measuring instruments are included by the invention. All critical components of the feed-through can thus be monitored in a feed-through according to the invention.

It is also possible for the feed-through to contain more than one monitoring opening for a through-opening. In particular, a fluid can then be conducted through one monitoring opening and conducted out again through the at least one further monitoring opening. One monitoring opening forms the inflow so to speak and the other monitoring opening forms the return flow so to speak for the fluid. The fluid, in the operating state, may be present in particular in the liquid or in the gaseous state. In particular, it may be a fluid for cooling, for example water or liquid $N_2$, which can prevent or at least delay the temperature damage to, in particular the melting of, functional components and/or insulation components, in particular in the event of a fault. Likewise, the medium may be a protective medium, for example a largely chemically inert liquid or a shielding gas, such as gaseous $N_2$ and/or gaseous He, Ar and/or other shielding or noble gases. The formation of an oxygenous flammable atmosphere can be prevented particularly advantageously by flushing with gaseous $N_2$ and/or other shielding gases. The use of fluids that change their state of matter in the event of a fault and may thus also serve for cooling and/or as shielding gas with low fluid conversion is also possible. The inflow and/or the return flow for the fluid may be located in the flange and/or in the insulation material. If the inflow and/or return flow is/are located in the flange, this can be achieved by appropriate bores in the flange. If the inflow and/or return flow is/are located in the insulation component, tubes can for example be embedded in said component for this purpose.

In accordance with the invention, the flange particularly preferably has a flange element that forms at least one sub-region of the inner wall of the through-opening, and in particular at least one of the electrical insulation components is arranged in this sub-region of the through-opening formed by the flange element.

The flange element may consist of a different material compared with the main body of the flange, in particular from a different metal, or may consist of the same material. The flange element advantageously forms at least one sub-region of the inner wall of the through-opening. At least one of the electrical insulation components is then advantageously arranged in this sub-region.

This means that a step-shaped recess may be provided in the flange, for example produced by drilling and/or milling and/or turning, in the portion of which having the greater diameter an annular element is inserted and is connected to the main body of the flange. The connection can be produced for example by welding. The inner diameter of the flange element advantageously corresponds to the diameter of the through-opening, such that a cylindrical through-opening is provided. At least one of the insulation components is then advantageously provided in the region of the through-opening, which is formed by the flange element. The material of the insulation component located there is adapted, as described previously, to the material of the surrounding through-opening, such that in this embodiment the material of the first insulation component and the material of the second insulation component may differ from one another, in particular if the material of the flange and the material of the flange element differ from one another. In particular, the insulation components may consist of different glasses and/or glass-ceramics.

If the first functional component is also formed in two parts, the material of the first functional component, which is connected by the insulation component to the region of the through-opening, which is formed by the flange element, may likewise advantageously be a material different from that of the other portion of the first functional component. The materials of the feed-through according to the invention can thus be adapted excellently to the requirements of the application. For example, the material of the flange element may have a different hardness and/or thermal expansion and/or a chemical resistance compared with the material of the flange.

What is particularly advantageous and also included by the invention is that, irrespective of the embodiment of the flange with or without further flange element, means for avoiding a relative movement between the flange and/or first functional component are provided in the through-opening and/or on the first functional component.

The means for avoiding the relative movement can be obtained by suitable profiles of the through-opening and/or the embodiment of the outer wall of the first functional component. In particular, the through-opening may have a profile that tapers at least locally and/or has a step. The tapering and/or step can serve as retention means, which mechanically makes it difficult for the insulation components to be pressed out when overpressure is applied to the side of the through-opening having the larger diameter. Besides steps, conical and/or partially conical profiles of the through-opening are possible in particular, for example. The inner wall of the through-opening is provided here so to speak with the means for avoiding the relative movement.

In a further advantageous embodiment, at least one of the insulation components has a coating. This may in particular strengthen the insulation component with respect to bending loads, as are produced in particular under compressive load. Since the insulation component, as described, may consist in particular of brittle materials, the coating may also prevent the insulation part from breaking if it suppresses the initial crack formation in particular on its side facing away from the compressive load. For example, coatings of the insulation component with plastics are advantageous.

As described, the invention makes it possible to use varied functional components as a first and second functional component, wherein the specific purpose of the feed-through according to the invention is determined by the functional components. The first functional component is particularly preferably selected from the group of electrical conductors (in particular as solid material or tubular) and/or ceramic tube components, in particular ceramic tube components. The second functional component is particularly preferably selected from the group of electrical conductors and/or thermocouple wires and/or optical waveguides and/or waveguides.

The invention also includes the use of the feed-through according to the invention in containment structures, in particular pressure vessels and/or reactor chambers and/or pump housings and/or generator housings and therefore also these vessels, chambers and/or housings themselves.

A particularly efficient production method for a preferred embodiment of an electrical feed-through according to the invention comprises the following steps:

Providing a flange, which normally consists of a metal and which has at least one through-opening.

Providing at least two insulation component preforms. These are usually compacts made of a glass, a ceramic and/or a glass-ceramic. The compacts are preferably annular.

Providing the at least first functional component and, where applicable, the second functional component and, where applicable, coaxially arranging the first tubular functional component and the second functional component.

Introducing the first insulation component preform into the through-opening.

Introducing the first and, where applicable, the arranged second functional component into the annular space of the first insulation component.

Introducing the second insulation component preform into the through-opening such that it is held in the through-opening.

Where provided: applying metal solder material into and/or onto the gap at the ends of the first and the second electrical conductor.

Heating all arranged components to a temperature that causes the insulation component preforms to fuse together with the inner wall of the through-opening and the first functional component, and, where applicable, causes the solder material to fuse between the first and the second functional component. During the fusing process, the separate insulation components are created and an electrically insulating connection that is hermetically tight in particular is created between the inner wall of the through-opening and the first functional component, and, where applicable, a connection that is hermetically tight in particular is created between the first and the second functional component.

Cooling the electrical feed-through.

The technique of glass fusing, compact production, etc., is known to a person skilled in the art of glass-metal seals. Of course, it is also possible to carry out the fusing of the first and/or second functional component in a separate method step. It is also possible and included by the invention for a flange to have a plurality of through-openings, in which the described feed-throughs are located.

The method can also be applied for embodiments in which the first functional component is connected to the flange without an insulation component, for example by being soldered in, welded in and/or screwed in the method step in question is then to be adapted accordingly.

The electrical feed-through according to the invention can be used in many applications. The application in containment structures, in particular pressure vessels and/or reactor chambers, but also in sensor and/or actuator or generator or pump housings is particularly preferable.

The invention will be explained further with reference to the figures. All figures are purely schematic, and the dimensioning and/or proportions of the electrical feed-throughs according to the invention actually existing and/or of the individual components thereof may deviate from the drawings. The figures also represent exemplary embodiments that have been produced by the described methods.

DETAILED DESCRIPTION

Figure 1:
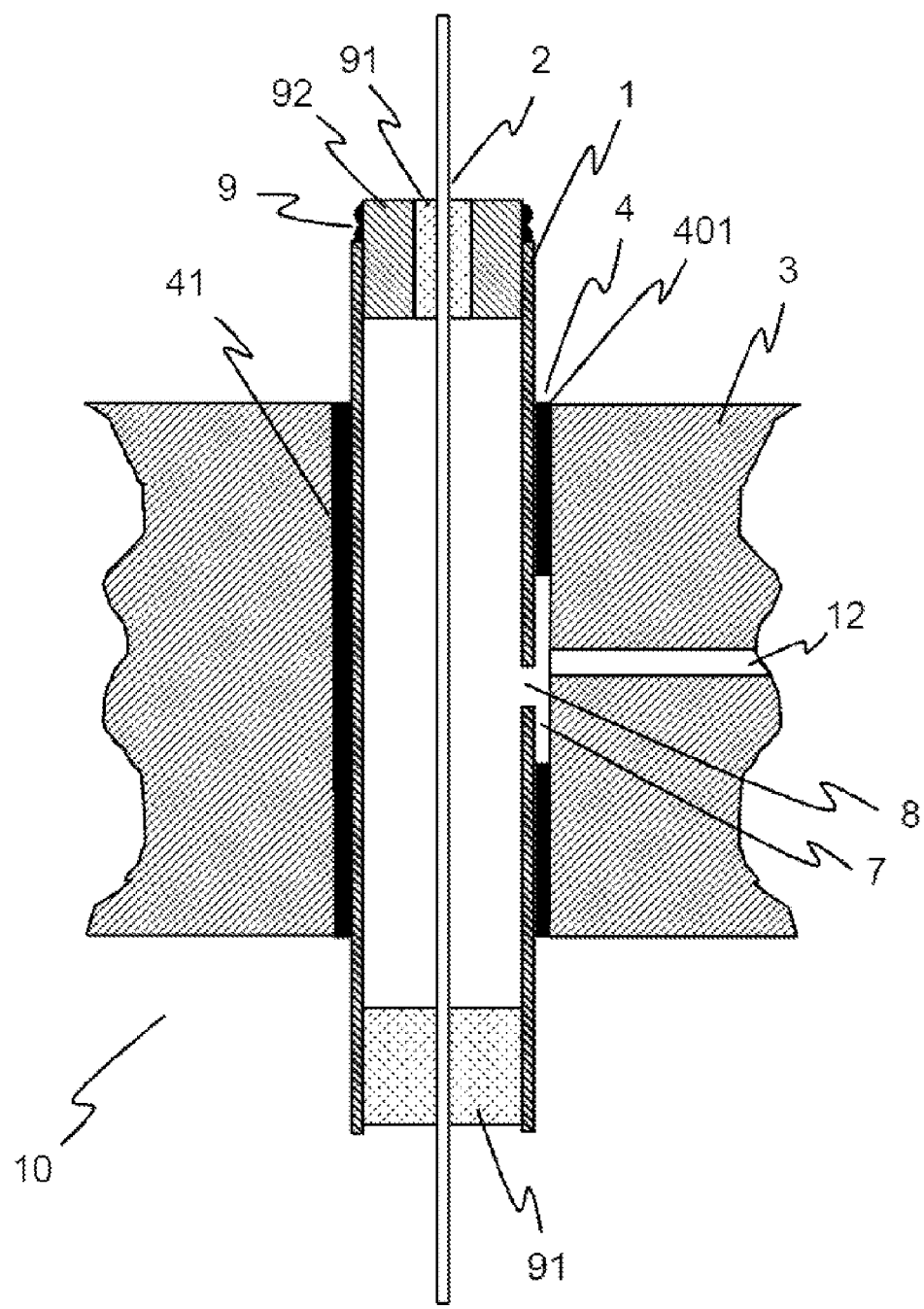
FIG. 1 shows the section through a feed-through according to the invention with a first and a second functional component, wherein the first functional component has a deformation region and is fitted directly in the through-opening.

FIG. 1 illustrates the section through a feed-through (10) according to the invention perpendicularly to the surface of the flange (3). A through-opening (4), which has an inner wall (41), is located in the flange. A tubular first functional component (1) is arranged in the through-opening and is connected to the inner wall (41) of the through-opening (4) such that the through-opening is closed. In the present example, the first functional element is a metal tube that is fixed in the through-opening (4) by means of a metal solder (401) as fixing material. A hermetic sealing of the through-opening (4) is thus achieved. This FIG. 1 is to represent the diagram of a feed-through for optical waveguides. Accordingly, the second functional component (2) is an optical waveguide, for example a glass fibre or a glass fibre bundle or a plastic fibre or a plastic fibre bundle. The first and the second functional element (1, 2) are preferably arranged such that their common longitudinal axis is perpendicular to the surface of the flange (3). Here, the first functional component (1) performs the function of holding the second functional component, in other words the optical waveguide (2).

The optical waveguide (2) can be held in the first functional component by many methods known to a person skilled in the art. In the illustrated example it is glazed into the glass and/or ceramic component (91) on the upper face in a metal sleeve (92). This technique known to a person skilled in the art likewise enables hermetic sealing. The metal sleeve (92) is in turn connected in a gap-free manner to the first functional component (1) by means of the connection material (9). The connection material (9) may in turn be a metal solder, but also a welded connection. The connection material (9, 91) may also be a plastic however, which then does not enable hermetic sealing however.

On the illustrated lower face, the optical waveguide (2) is connected directly to the first functional component (1). The connection material (91) may be a plastic in particular at this point, however a glazing in is also possible. The illustration also symbolizes that both ends of the functional components (1, 2) can be connected and/or closed by different measures in each embodiment of the feed-through (10) according to the invention.

The first functional component (1) comprises the deformation region (8). The first functional component (1) is connected to the inner wall (41) of the through-opening (4), as illustrated, such that the connection material (401), here the metal solder, does not completely fill the through-opening (4), but leaves free a hollow space (7) locally in the region of the deformation region (8). This hollow space (7) is connected to the deformation region (8), which here is a recess penetrating through the first functional component (1), and thus makes the interior of the tubular first functional component (1) accessible. The monitoring opening (12) is provided in the flange (3) and meets the hollow space (7). Measuring instruments can be attached to the monitoring opening, as described. A breakage of the barrier of the closure material (401), but also the fixing of the optical waveguide (2) by means of the closure materials (9, 91, 92) between the optical waveguide (2) and the first functional component (1) can thus be detected.

Figure 2:
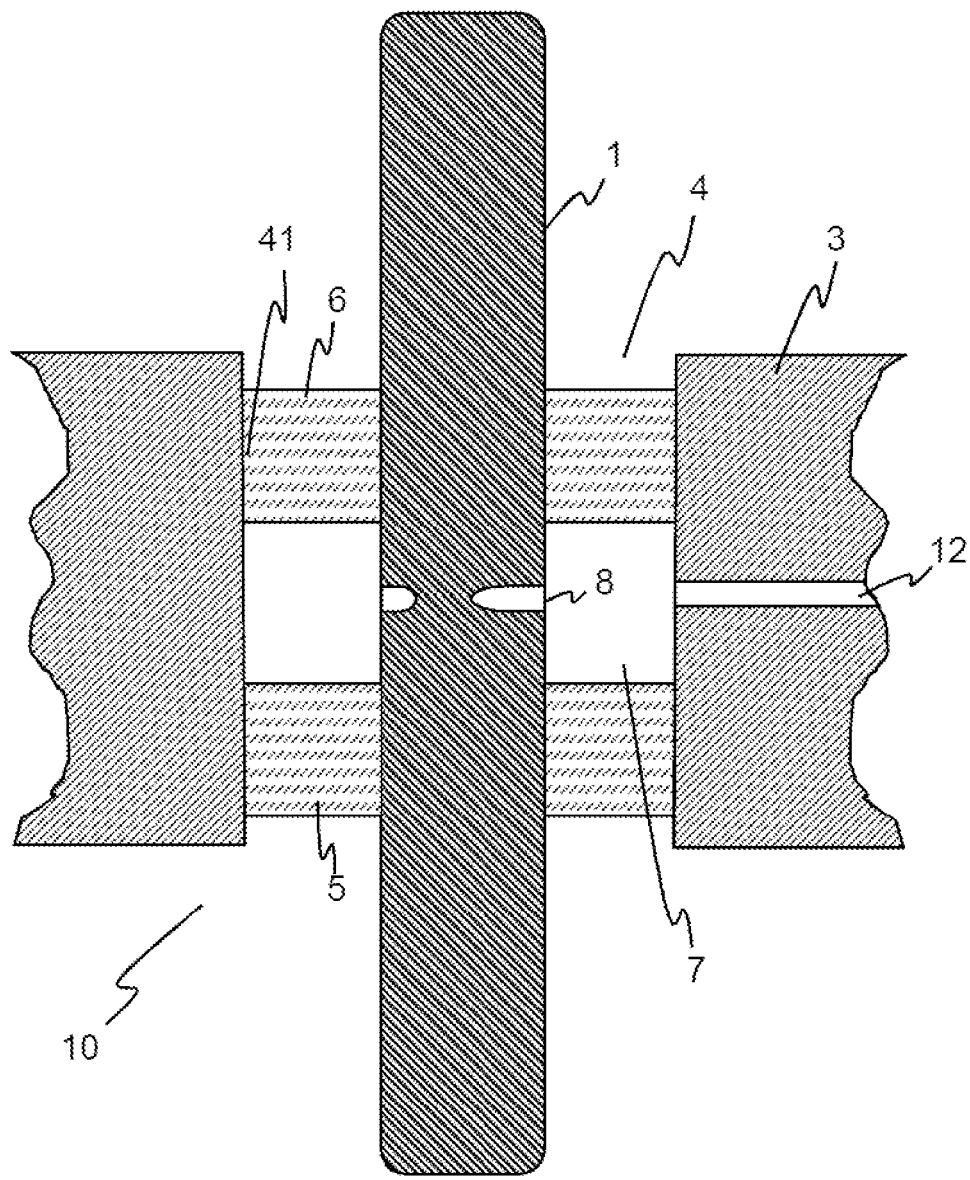
FIG. 2 shows the section through a feed-through according to the invention with a first functional component, which is formed in one part and is fitted in an electrically insulated manner in the through-opening.

FIG. 2 shows the section through a feed-through (10) according to the invention which represents an electric conductor for small amperages. Only the first functional component (1) is provided, which is formed in one part and functions as an electrical conductor. It consists accordingly in particular of a metal, including metal alloys.

The first functional component, that is to say the aforementioned electrical conductor (1) formed in one part, comprises the deformation region (8) and has to be held in the through-opening (4) of the metal flange (3) in an electrically insulated manner. This is achieved by the separate insulation components (5, 6), which are fabricated in particular from glass and/or glass-ceramic materials, as described before in order to achieve a hermetic sealing of the through-opening (4). If lesser requirements are placed on the hermeticity, insulation components (5, 6) made of plastics are also possible however. The two separate electrical insulation components (5, 6) form, in the through-opening, the hollow space (7), which is annular in particular and in which the deformation region (8) is arranged and which can be connected to measuring instruments by means of the monitoring opening (12). A breakage of one of the insulation components (5, 6) can be detected as a result. The selection of the possible materials for the conductor (1) is limited to such materials that can be connected to the materials for the insulation components (5, 6). In the case of insulation components made of glass and/or ceramic materials, these are Ni—Fe alloys, Inconel, Co alloys, steel, high-grade steel, etc. in particular. These materials normally have a lower conductivity than copper for example, as a result of which the electrical currents that can be transmitted by this exemplary embodiment are limited in terms of their intensity. For this purpose, this exemplary embodiment has advantages with respect to the low production cost and the adaptation in terms of thermal dilation.

It can also be seen with reference to FIG. 2 that the plane of the surface of at least one insulation component (5, 6) facing away from the hollow space (7) advantageously does not protrude beyond the surface of the flange (3), but that at least one insulation component (5, 6) is fitted in the through-opening (4) in a sunken manner so to speak. The insulation component (5, 6) is thus additionally protected against mechanical damage. This is true in particular for all exemplary embodiments with insulation components (5, 6).

Figure 3:
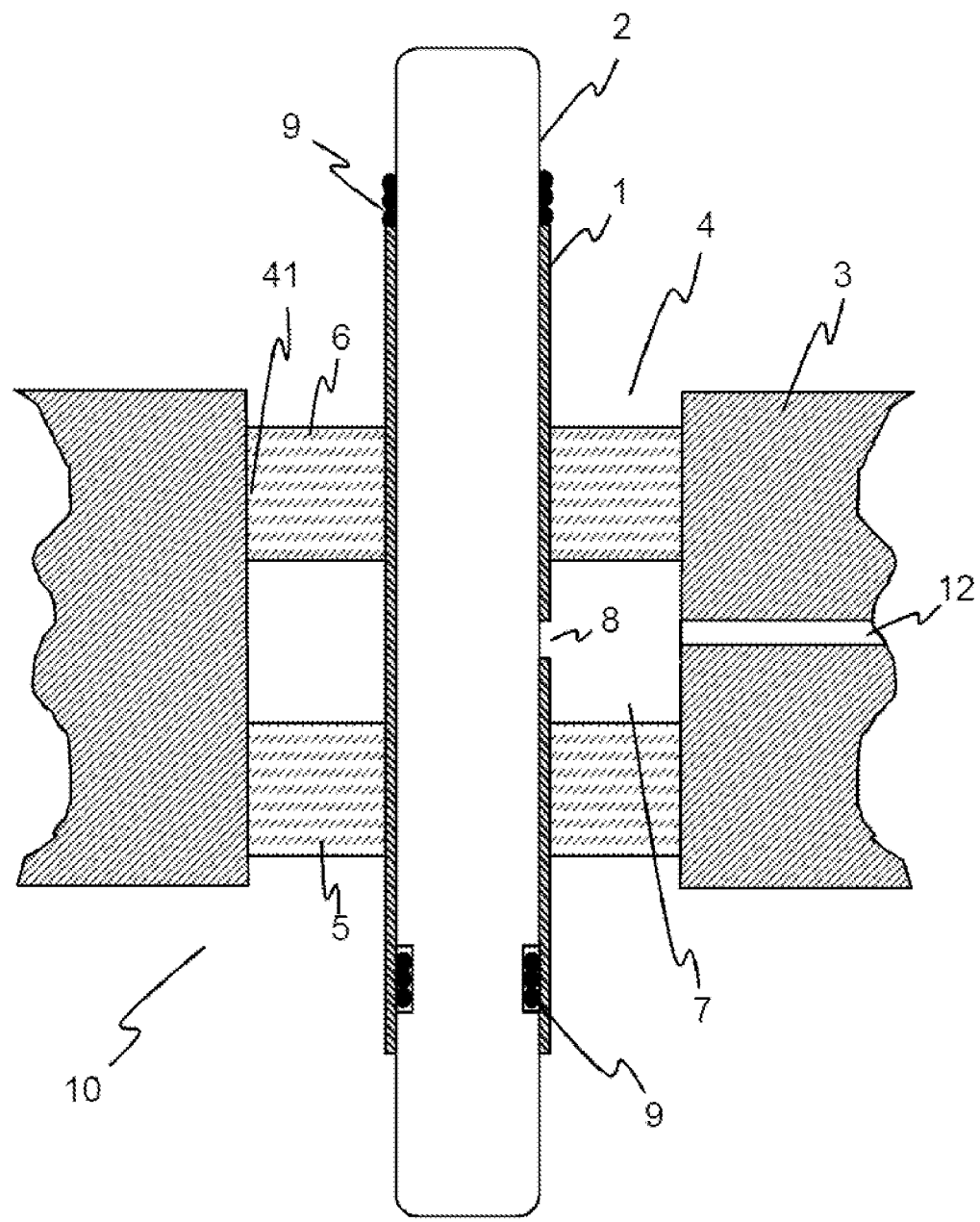
FIG. 3 shows the section through a feed-through according to the invention with a first tubular functional component and a second functional component that is formed in one part.

FIG. 3 shows the section through a feed-through (10) according to the invention with a first tubular functional component (1) and a second functional component (2), which is formed in one part. This embodiment in particular illustrates the diagram of an electrical feed-through that is suitable as an electric conductor for greater electrical currents.

The first functional component (1) is formed here in a tubular manner and is held in the through-opening, in particular glazed in, by the insulation components (5, 6). The second functional component (2) is introduced as an electrical conductor in the interior of the tubular first functional component (1). The second functional component (2) may consist in this embodiment of a different material compared with the first functional component (1) and is formed in one part in this example. Exemplary materials for the first functional component (1) include Ni—Fe alloys, Inconel, Co alloys, steel, high-grade steel, etc. The second functional component (2) preferably comprises copper or Cu alloys, or aluminium or Al alloys. The first functional component (1) here performs the function both of an electrical conductor and of a holding component for the second conductor suitable for higher amperages.

The first and the second functional component (1, 2) are interconnected at two points in a gap-free manner in accordance with this embodiment. In the illustrated example, the solder rings (9) are used for this purpose and in accordance with the drawing can be fitted on a region of the second functional component (2) protruding beyond the first functional component (1) at the edge to the first functional component (1). The solder rings (9) seal so to speak the gap between the first and second functional component (1, 2) from above. In the illustration, the solder rings (9) are illustrated as rings that may consist of a conventional metal solder. Due to the soldering process, they melt together and are no longer to be perceived as rings. The gap is then sealed by a region of molten solder. Alternatively, the soldering process may also be carried out by means of a paste, preform or a solder wire.

Due to the solder, the functional components (1, 2) are in electrical contact, even if the two functional components in the tubular portion of the first functional component (1) are no longer in contact, for example with an enlargement of the gap as a result of the different thermal expansion of the materials.

To close the gap between the first functional component (1) and the second functional component (2), it is also possible to locally reduce the wall thickness of the tubular first functional component (1) and to fit solder rings (9) there for example, as illustrated in FIG. 1 in the lower part of the functional components (1, 2). Not only can the gap then be closed at the edge between the first and second functional component (1, 2), but also at any point of the system formed from the first and second functional component (1, 2). The gap is preferably closed hermetically. A hermetic closure can be achieved not only by a soldering process with the aid of solder material (9), but also by other methods, for example by welding.

The first functional component and the second functional component connected thereto (1, 2) are held in the through-opening by the two separate electrical insulation components (5, 6). The insulation components (5, 6) close the through-opening (4) hermetically. For this purpose, they preferably consist of glass and/or glass-ceramic. An important criterion for the permanent hermeticity of the glass-metal composite is that the coefficients of thermal expansion of the interconnected materials are matched to one another. In the present case, the coefficient of thermal expansion of the glass of the insulation components (5, 6) is thus matched to the material of the flange (3) and the material of the first functional component (1). The flange (3) usually consists of a steel, such that the glass of the insulation components (5, 6) is matched to the steel of the flange (3) and a material for the first functional component (1) is sought that matches this coefficient of thermal expansion. If, for example, a high amperage is required for certain applications, copper may be the preferred material for an electrical conductor. The coefficient of thermal expansion thereof would be incompatible however with the glass and the material of the flange, such that direct glazing in of a copper conductor cannot constitute a permanent solution. By contrast, it is possible to solder and/or to weld copper to NiFe alloys, steels, Inconel, Co alloys, etc., for example. The solution that is preferred in accordance with the invention with a first and a second functional component (1, 2) therefore makes it possible to render the first functional component (1) an adaptation component so to speak, which makes it possible to glaze in conductor materials that would otherwise be incompatible.

The glass of the insulation components (5, 6) can be selected such that its thermal expansion corresponds approximately to that of the flange (3) and that of the first function component (1). This corresponds to the "adapted feed-through". Particularly good hermeticities and mechanical load-bearing capabilities of the feed-through can be achieved by using what is known as a compression feed-through, with which the material of the insulation components, for example glass and/or glass-ceramic, has a low thermal expansion compared to the flange (3). When cooling the connection produced by the joining process between the insulation components (5, 6), flange (3) and first functional component (1), the flange shrinks so to speak onto the insulation components (5, 6) and exerts a compressive stress thereonto. This compressive stress clamps the insulation components so to speak in the through-opening, such that the retaining forces generated by the compressive stress add to the forces generated by chemical bonding and other surface effects.

Both the described adapted feed-through and the compression feed-through are advantageously also integral connections between the material of the inner wall (41) of the through-opening (4) and the insulation components (5, 6). In the case of the integral connection, a chemical bond in particular is formed in the interfacial region between the connected components.

The two insulation components (5, 6) are separated from one another and are annular for example in accordance with the drawing. They form the annular hollow space (7) between the inner wall (41) of the through-opening (4) and the surface of the first functional component (1). The deformation region (8) of the first functional component (1) is located in the hollow space (7) and, in the example, is a recess in the first functional component (1), said recess penetrating through the wall and the surface of the second functional component (2) being accessible through the recess. The recess may be a bore and/or a slot in the first functional component (1), for example. In the deformation region (8), the system formed from the first and the second functional component (1, 2) may deform more strongly under mechanical load, as described, and may thus intercept a prevailing mechanical load during operation.

If the described closure between the first and second functional component (1, 2) fails, medium infiltrating through this gap may reach the hollow space (7) through the recess in the deformation region (8). The hollow space (7) is connectable in accordance with the drawing to measuring instruments through the monitoring opening (12) in the flange (3). The medium infiltrating or exiting from the hollow space (7) in the event of damage, either due to the gap between the functional components (1, 2) and/or due to failure of the connection between at least one of the insulation components (5, 6) and the components connected thereto and/or by breakage of at least one of the insulation components (5, 6), can be detected by the measuring instruments, for example by a pressure change. It is also possible to detect medium possibly provided in the hollow space (7) and exiting from the hollow space in the event of damage using measuring instruments connected to the monitoring opening (12).

Figure 4:
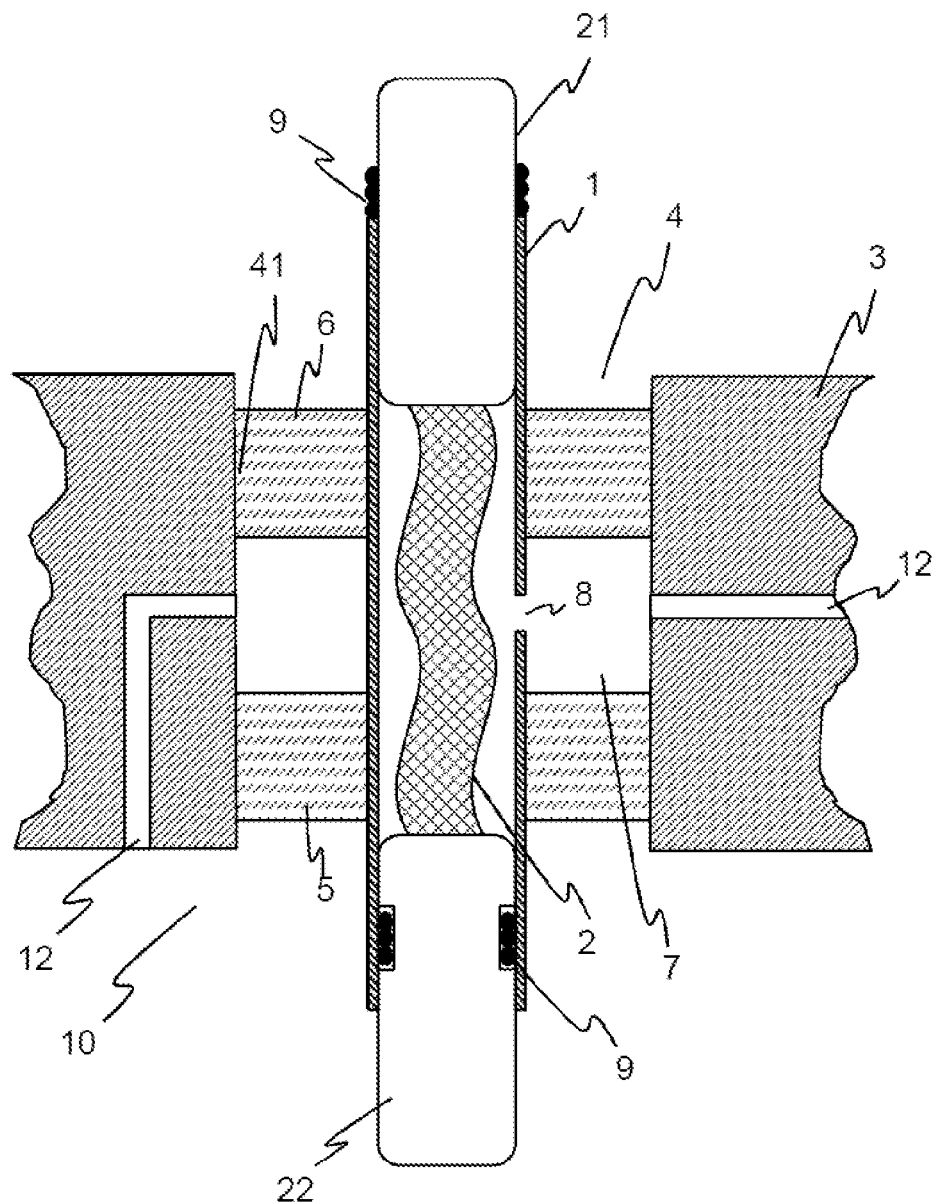
FIG. 4 shows the section through a feed-through according to the invention with a first tubular functional component and a second functional component that has two portions, which are interconnected by a flexible structure.

FIG. 4 shows the section through an electrical feed-through (10) according to the invention perpendicularly to the surface of the flange (3). It corresponds largely to the embodiment in FIG. 3 and differs merely in that the second functional component (2) as an electrical conductor comprises two portions (21, 22), which are interconnected by a flexible electrically conductive structure (23), here an electrically conductive strip (23). In the present example, the electrically conductive strip (23) is formed as a copper braid. Preferably, and as illustrated in FIG. 4, the deformation region (8) is arranged in the portion of the first functional component (1) in which the flexible structure (23) of the second functional component (2) is also provided. The flexible structure (23) enables particularly efficient function of the deformation region (8), in particular because it promotes the compression and/or distension and/or torsion of the system formed from the first and second functional component (1, 2) along the longitudinal axis and/or the mutual tilting and/or shearing motion of the portions (21, 22) of the second functional component (2) and allows the feed-through (10) according the invention to thus intercept mechanical loads particularly efficiently.

A second monitoring opening (12), which in this example runs through the flange (3) in an L-shaped manner and for example can be produced by corresponding bores, is also illustrated. The hollow space (7) is therefore accessible through the two monitoring openings (12). The monitoring openings (12) can serve in particular as an inflow and return flow of a cooling fluid that can be conducted into the hollow space (7) and, as already described, can increase the temperature stability of the feed-through (10), in particular in the event of a fault. The described protective fluid, for example shielding gas, in particular gaseous nitrogen ($N_2$), may also prevent the formation of an explosive mixture in the hollow space (7). Should an insulation component break, it is also possible to introduce the cooling and/or protective fluid into the spaces that are otherwise closed by the flange. Fluids that have a phase transition, for example that have temperature ranges occurring with expansion or in the event of a fault, can be particularly advantageous, in particular because a particularly efficient cooling effect can thus be produced, even if the produced gas may serve simultaneously as shielding gas. A loss of the fluid and/or a pressure drop and/or a pressure increase and/or a change to the composition of the fluid can be detected by attached measuring instruments, and damage to the feed-through (10) and/or the presence of a fault can thus be identified automatically.

Figure 5:
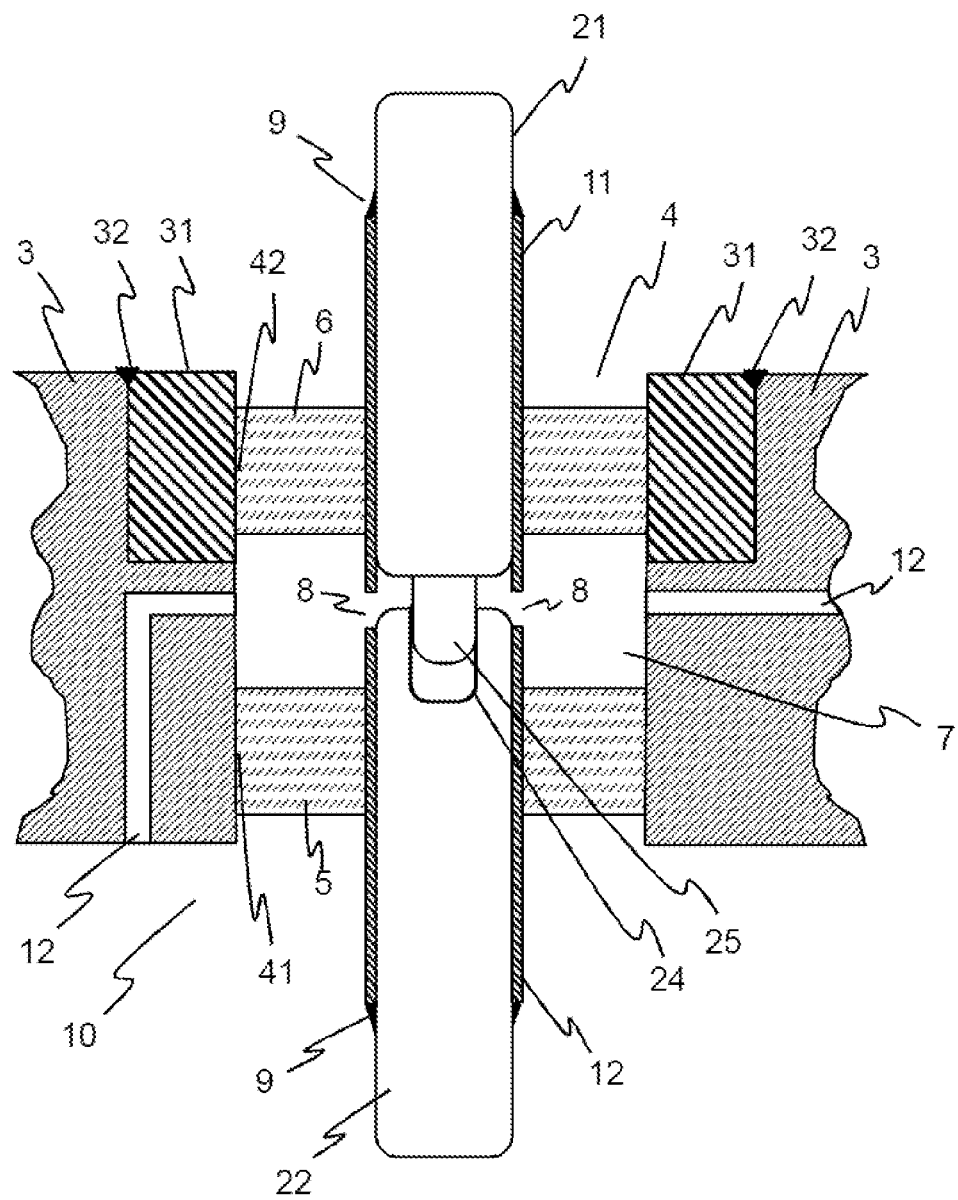
FIG. 5 shows the section through a feed-through according to the invention with a first tubular functional component and a second functional component that has two portions, which are interconnected by structures that engage in one another.

In FIG. 5, the section perpendicular to the surface of the flange (3) through a feed-through (10) according to the invention having a first and a second functional component (1, 2) is illustrated. The second functional component (2) has two portions (21, 22), which are interconnected by structures (24, 25) that engage in one another. The structures (24, 25) that engage in one another can be formed as a plug and socket as illustrated in the figure. This embodiment is suitable in particular for transmitting electrical current, the two portions (21, 22) being electrical conductors. The two portions (21, 22) of the second functional component (2) can be displaced with respect to one another along the longitudinal axis. The deformation region (8) is produced by an interruption of the first functional component (1), which consists here of two tubular portions. The solution according to the other figures is also possible however. It is also possible to use the embodiment shown in FIG. 5 of the first functional component (1) and of the deformation region (8) for the exemplary embodiments in the other figures.

The gap between the first and the second functional component (1, 2) is not closed by soldering in this exemplary embodiment, but by welding. Accordingly, the weld seam (9) is located at the ends of the first functional component (1) in connection to the second functional component (2). As before, this possibility can also be applied with the other exemplary embodiments. A soldering process may also take place in this exemplary embodiment.

In the exemplary embodiment in FIG. 5, a special possible embodiment of the flange (3) is also shown, in which a ring is welded in here as a flange element (31) made of the same or a different metal compared to the flange material. The weld seam (32) is accordingly located on the flange and connects the flange (3) and the flange element (31). The inner wall of the through-opening (4) therefore comprises portions (41, 42) made of different materials, in particular different metals having different thermal expansion in particular. This embodiment has the advantage that, if a different material is used for the flange element (31) than for the flange (3), the welded-in material (31) may have different properties compared with the material of the basic flange (3), for example in terms of thermal expansion. This makes it possible for the insulation component (6) to be attached thereto to consist of a different material compared with the other insulation component (5), in particular from a different glass. In the embodiment with the first and second functional components (1, 2) in two parts, the portions may then likewise consist of different materials. In this way, the feed-through (10) can be adapted particularly well to the requirements of the application, for example if the used materials are to meet specific requirements with respect to chemical resistance and/or material hardness and/or temperature resistance, etc. This is also true for all embodiments. The other features of the embodiment shown in FIG. 5 correspond substantially to the previous figures.

Figure 6:
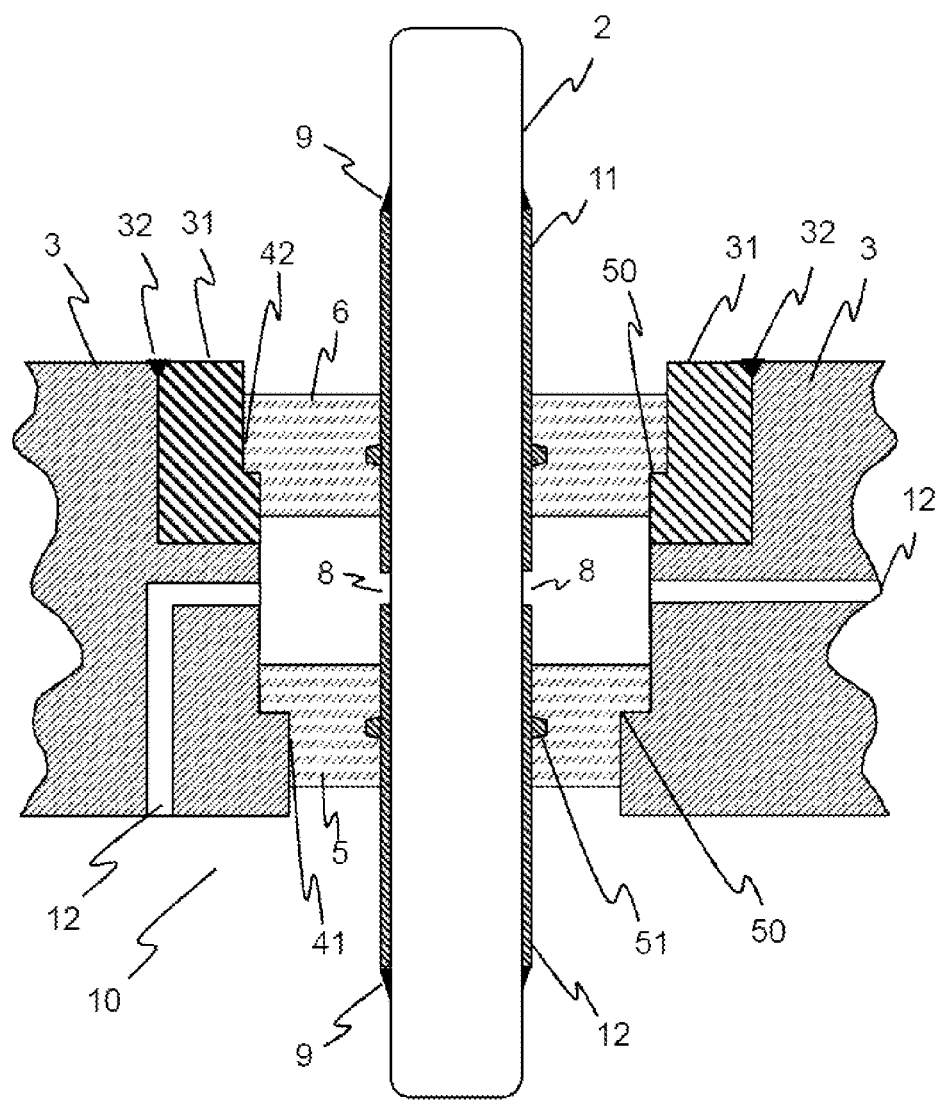
FIG. 6 shows the section through a feed-through according to the invention, in which the second functional component is formed in one part, the flange comprises a welded-in flange element, and the through-opening and also the first functional component have means for avoiding a relative movement.

FIG. 6 shows the section perpendicular to the surface of the flange (3) through a feed-through (10) according to the invention in an embodiment that corresponds substantially to a combination of FIGS. 3 and 5. The first functional component (1) is formed in two portions (11, 12) as tube portions, whereas the second functional component (2) is formed in one part, for example as a copper rod. The gaps between the first and second functional component (1, 2) are closed by the weld seams (9), as described before. The flange (3) has a further flange element (31), which is welded into the flange (3) by the weld seam (32). As a development of the invention, means for avoiding the relative movement (50, 51) between the flange (3) and first functional component (1) are provided in this figure and exemplary embodiment.

The means for avoiding the relative movement (50, 51) between the flange (3) and first functional component (1) are provided in accordance with the invention and in the drawing both on the inner wall (41, 42) of the through-opening (4) and on the first functional component (1). A large number of possibilities are available for the specific embodiment of the means for avoiding a relative movement between the flange (3) and first functional component (1), in particular for preventing the first functional component from sliding out, particularly under compressive load. In order to prevent the first functional component (1) from detaching from the insulation components (5, 6) or, in an alternative (not illustrated), from the fixing material (401) when the entire feed-through (10) is subject to load, means for avoiding a relative movement (50) are provided on the inner periphery of the through-opening (4). These means are characterized by a local change of the diameter of the through-opening (4), in the drawing in FIG. 6 by the steps (50) arranged in the through-opening (4). In particular if a compressive load is exerted from the direction of the larger diameter of the through-opening (4), the fixing material, here the insulation components (5, 6), and therefore also the first functional component (1), is better held in the through-opening by the means for avoiding the relative movement (50). If the means for avoiding the relative movement (50) are provided in the through-opening, this has the advantage that they ensure that the fixing material (5, 6, 41) is securely held, even in the event of deformation of the flange (3) in the direction of the aforementioned compressive load, in particular a deflection. It has been found that a deformation of the flange (3) may even increase the retaining force of the fixing material (5, 6, 401), since, during the deformation, the fixing material is clamped in the through-opening (4) on the side facing the compressive load. This additional clamping force is stronger than the effects produced by a possible gap formation on the side remote from the compressive load, in particular if the means for avoiding the relative movement (50) are provided in the through-opening (4).

Means for avoiding the relative movement (51), which are fitted on the first functional component (1), are also illustrated in FIG. 6. Generally speaking, these means are also local changes to the outer diameter of the first functional component (1), here the projections (51). The means for avoiding the relative movement (50, 51) between the flange (3) and first functional component (1) also do not have to be designed, as illustrated in FIG. 6, to prevent the first functional component (1) and therefore also the second functional component (2) possibly present from being pressed out from the through-opening, but may also be formed such that a twisting of the first functional component (1) and, where applicable, of the fixing material (401) and/or of the insulation components (5, 6) in the through-opening (4) is prevented. To this end, structures running in particular along the inner wall (41, 42) of the through-opening (4) largely perpendicularly to the surface of the flange (3) may be suitable, for example channels or ridges in the through-opening.

Of course, any suitable structures in the through-opening (4) and/or on the first functional component (1) are possible as means for avoiding the relative movement (50, 51) and are included by the invention.

Figure 7:
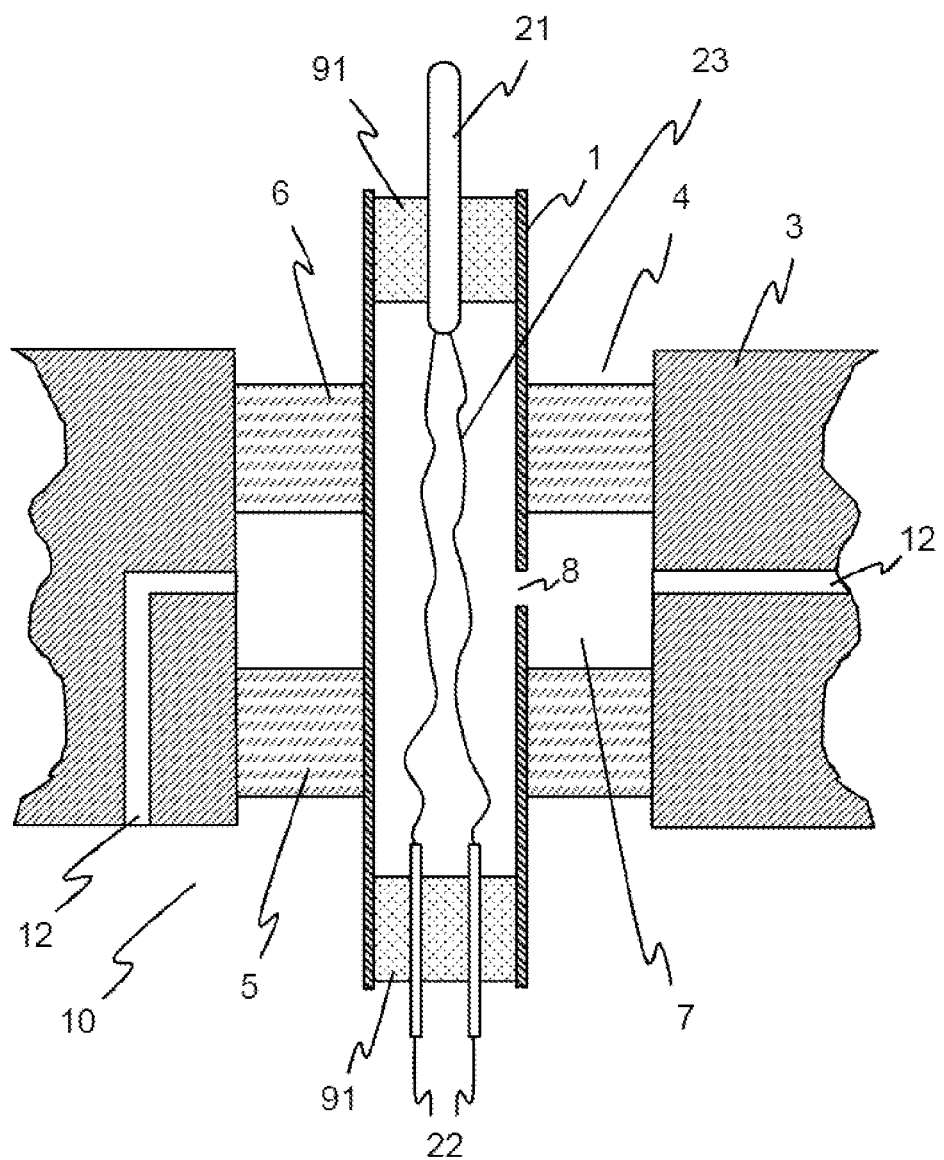
FIG. 7 shows the section through a feed-through according to the invention, in which the second functional component comprises a plurality of elements.

FIG. 7 shows an embodiment in which the flange (3), insulation components (5, 6), etc. can be formed as in the previously described figures, however the second functional component may be formed by a combination of a plurality of functional component elements (21, 22, 23). In particular, the functional component element (21) may be a sensor, which is connected to the plugs (22) by the signal conductors (23), for example electrical wires.

Figure 8:
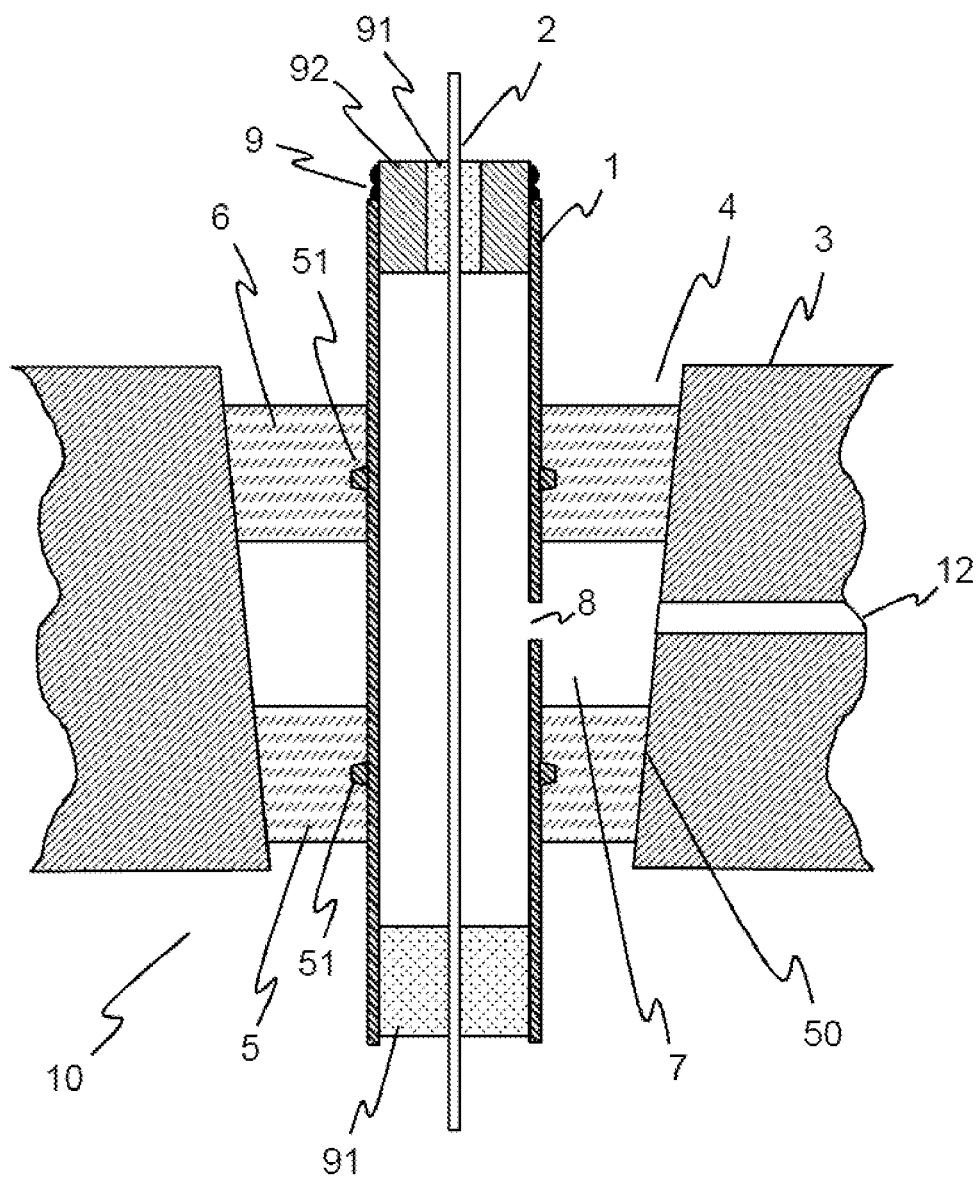
FIG. 8 shows the section through a feed-through according to the invention, in which the second functional component is an optical waveguide and means for avoiding a relative movement are provided.

FIG. 8 basically shows an embodiment according to FIG. 1, in which the means for avoiding the relative movement (50) in the through-opening (4) are achieved by a continuous profile of the through-opening. The compressive load is again applied from the direction of the maximum diameter of the through-opening, and the flange is usually mounted in a suitably oriented manner on the containment structure.

Figure 9:
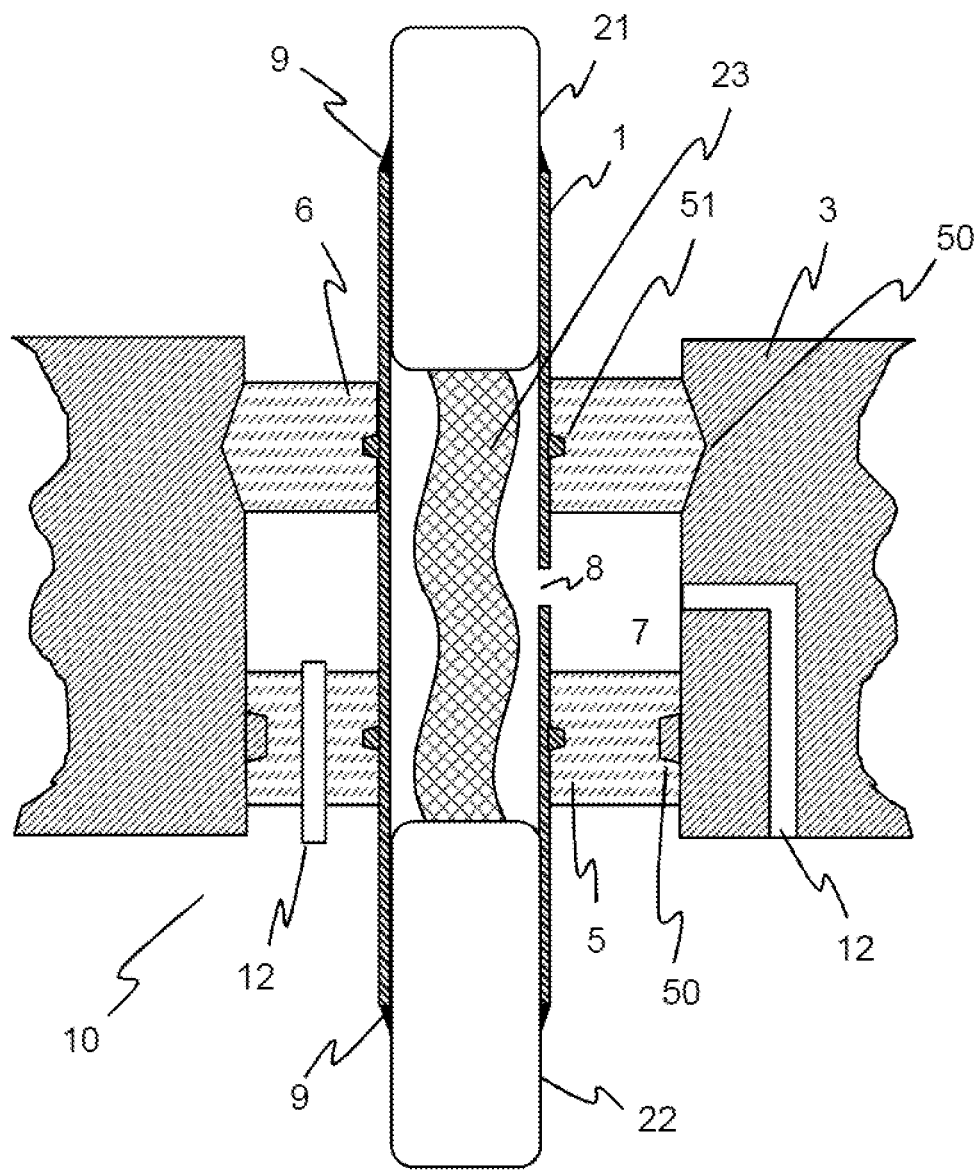
FIG. 9 shows the section through a feed-through according to the invention with a first tubular functional component and a second functional component that has two portions, which are interconnected by a flexible structure, with alternative means for avoiding the relative movement.

FIG. 9 again basically shows an embodiment corresponding to FIG. 4, with alternative means provided in the through-opening (4) for avoiding a relative movement (50) between the flange (3) and first functional component (1). An expansion (50) of the diameter is thus provided in a region of the through-opening (4) in which the insulation component (6) is fitted, whereas a local reduction of the diameter of the through-opening (4) is provided in the region in which the other insulation component (5) is fitted.

As explained with regard to the production method, a temperature process is used in particular to produce the closure of the through-opening (4), in which process the fixing material (401), here the material of the insulation components (5, 6), is at least softened. The fixing material can thus flow around and/or flow into the means for avoiding the relative movement (50, 51). It is thus possible to embed the means for avoiding the relative movement (50, 51) into the fixing material.

Whether no, one, two, or more monitoring openings (12) is/are provided in the feed-through (10) according to the invention is dependent on the respective application. Each of the embodiments illustrated in the figures can also be provided with no, one, or more monitoring openings (12).

Figure 10:
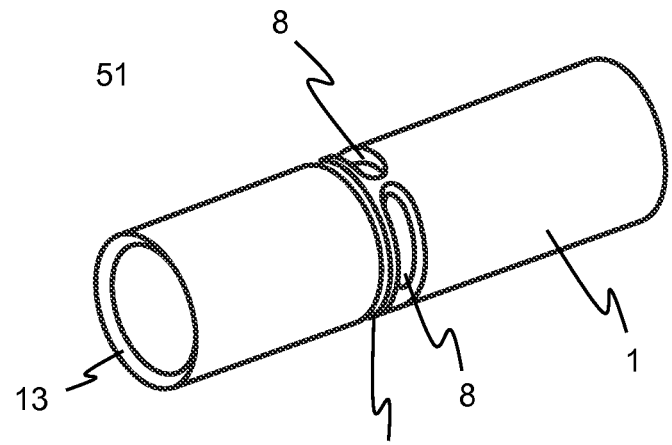
FIG. 10 shows the form of a first electrical functional component with deformation region.

FIG. 10 shows the form of a first functional component (1) with the deformation region (8), of which the recesses are formed as slots in a tubular basic structure. A groove (51) is also illustrated and may serve as means for avoiding a relative movement between the flange (3) and the first functional component (1). The chamfer (13) at the edges of the tubular first conductor (1) is also illustrated, the angle of said chamfer preferably being 45° tilted inwardly in the direction of the longitudinal axis. The chamfer can be used particularly favourably when closing the gap with the aid of solder rings (9), since a larger surface for adhesion of the solder is thus created.

Figure 11:
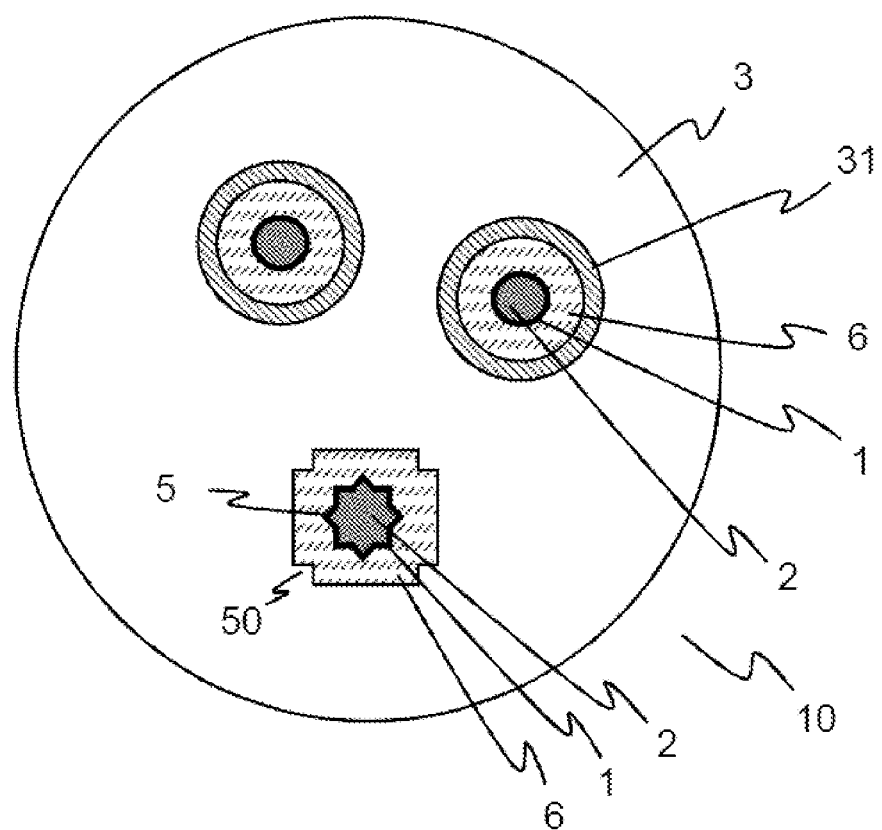
FIG. 11 shows the plan view of a feed-through according to the invention in which more than one through-opening is provided in the flange.

FIG. 11 shows the plan view of a feed-through (10) according to the invention, in which more than one through-opening (4) is provided in the flange (3), and in which an electrical feed-through comprising a first and second functional component (1, 2) is inserted in each of the through-openings. In the illustrated example, the optional annular flange element (31) is also provided in the flange (3) and forms a portion of the through-opening (4). The through-openings (4) can contain means for avoiding a relative movement (50, 51) between the flange (3) and first functional component (1). A through-opening is symbolized by the non-round geometry of the diameter thereof. The means for avoiding a relative movement (50) are provided there along the inner wall of the through-opening in the direction of one opening to the other opening, represented here by the plan view of the webs (50). The first functional component (1) may also comprise webs (51). This through-opening is secured against twisting in particular, that is to say the functional components (1, 2) can be acted on in particular by torque.

The feed-through (10) according to the invention has the advantage that it can be produced at low cost due to the presence of just one flange and that it can resist higher mechanical loads. Even in the event of overload, the barrier formed by the feed-through is not ruptured. Even minimal damage can be detected during operation, such that suitable maintenance measures and/or fault alarms can be triggered in an automated manner in particular. The feed-through (10) according to the invention is therefore fault-proof and contributes to improving the operational reliability of containment structures for example.

What is claimed is:

1. A feed-through comprising:
   a flange having a through-opening with an inner wall;
   a first functional component arranged within the through-opening and connected to the flange such that the through-opening is sealed; and
   a second functional component connected with the first functional component in a gap-free manner at least at opposite ends by connection material,
   the first functional component being formed substantially from at least one metal and having at least one deformation region that is deformable when mechanical load is applied, and
   the at least one deformation region being formed by at least one recess that locally penetrates through the first functional component or reduces a material thickness thereof such that a mechanical stability of the first functional component is reduced in the at least one deformation region, wherein the first functional component is arranged in the through-opening so as to form a hollow space between the inner wall and the at least one deformation region and so that the at least one deformation region is between the connection material at the opposite ends.

2. The feed-through according to claim 1, wherein the first functional component is formed substantially from at least one metal and having at least two separate tube portions that are connected to the second functional component.

3. The feed-through according to claim 2, wherein the deformation region is formed by spacing between the at least two separate tube portions of the first functional component so that the at least two separate tube portions of the first functional component can move relative to each other when the mechanical load is applied.

4. The feed-through according to claim 2, wherein the first functional component is formed in a tubular manner at least in portions, the second functional component is arranged in the tubular portions.

5. The feed-through according to claim 4, wherein the second functional component comprises at least two portions, which, with extension and/or compression of the deformation region along a longitudinal axis thereof, can be moved in a directed selected from the group consisting of distended and/or compressed with respect to one another, tilted with respect to one another, twisted with respect to one another, subjected to a shear stress relative to one another, and combinations thereof.

6. The feed-through according to claim 5, wherein the two portions of the second functional component are connected by a flexible structure.

7. The feed-through according to claim 5, wherein the two portions of the second functional component are connected by structures that engage with one another and are interconnected in an extendable and/or retractable manner.

8. The feed-through according to claim 1, wherein the first functional component is connected to the flange.

9. The feed-through according to claim 8, wherein the first functional component is connected to the flange by at least two separate insulation components in a manner electrically insulated by the flange and is held in the through-opening, wherein the insulation components form the hollow space therebetween and between the inner wall of the through-opening and the first functional component.

10. The feed-through according to claim 9, further comprising at least one monitoring opening running through the flange and/or at least one of the two separate insulation components.

11. The feed-through according to claim 10, wherein the hollow space is connectable by the at least one monitoring opening to a measuring instrument.

12. The feed-through according to claim 10, wherein fluid can be introduced into and/or discharged from the hollow space through the at least one monitoring opening.

13. The feed-through according to claim 1, wherein the first functional component is tubular and wherein the deformation region is at least one recess in the first functional component, the at least one recess connecting the interior of the first functional component and the hollow space.

14. The feed-through according to claim 1, wherein the first functional component is selected from the group consisting of electrical conductors made of solid material, tube components made of at least one metal, and combinations thereof.

15. The feed-through according to claim 14, wherein the second functional component is selected from the group consisting of electrical conductors, thermocouple wires, optical waveguides, waveguides, and combinations thereof.

16. Use of the feed-through according to claim 1 in a containment structure selected from the group consisting of a pressure vessel, a reactor chamber, a pump housing, a generator housing, and combinations thereof.

17. The feed-through according to claim 1, wherein the connection material is a material selected from the group consisting of glass, glass-ceramic, ceramic, metal, metal solder, welded connection, and plastics.

18. A feed-through comprising:
a flange having a through-opening with an inner wall;
a first functional component arranged within the through-opening;
material connecting the first functional component to the inner wall of the through-opening at least at opposite ends of the flange,
the first functional component being formed substantially from at least one metal and having at least one deformation region that is deformable when mechanical load is applied, and
the at least one deformation region being formed by at least one recess that locally penetrates through the first functional component or reduces a material thickness thereof such that a mechanical stability of the functional component is reduced in the at least one deformation region, wherein the first functional component is arranged in the through-opening so as to form a hollow space between the inner wall and the at least one deformation region and so that the at least one deformation region is between the material at the opposite ends.

19. The feed-through according to claim 18, wherein the material is selected from the group consisting of glass, glass-ceramic, ceramic, metal, metal solder, welded connection, and plastics.

20. The feed-through according to claim 18, wherein the first functional component comprises two separate portions, one of the two separate portions being connected to the flange by the material at one of the opposite ends and another of the two separate portions being connected to the flange by the material at another of the opposite ends.

21. The feed-through according to claim 20, wherein the deformation region is formed by spacing between the two separate portions of the first functional component so that the two separate portions of the first functional component can move relative to each other when the mechanical load is applied.

22. The feed-through according to claim 18, wherein the second functional component is in the first functional component.

23. The feed-through according to claim 22, wherein the second functional component is connected to the first functional component in a gap-free manner at least at opposite ends of the first functional component by additional material.

24. The feed-through according to claim 18, further comprising a step on at least one of the inner wall and an outer portion of the first functional component, the step being arranged where the material connects the first functional component to the flange.

* * * * *